United States Patent [19]
Namie et al.

[11] 3,903,148
[45] Sept. 2, 1975

[54] PROCESS FOR PREPARATION OF BENZOIC ACID
[75] Inventors: Koshi Namie; Tomio Harada; Takao Fujii, all of Matsuyama, Japan
[73] Assignee: Teijin Hercules Chemical Co. Ltd., Tokyo, Japan
[22] Filed: Aug. 13, 1973
[21] Appl. No.: 387,742

[30] Foreign Application Priority Data
Aug. 14, 1972 Japan.............................. 47-80699

[52] U.S. Cl............................................. 260/524 R
[51] Int. Cl.².......................................... C07C 63/06
[58] Field of Search ................................ 260/524 R

[56] References Cited
UNITED STATES PATENTS
2,245,528   6/1941   Loder............................. 260/524 R
3,064,043   11/1962  Taylor et al.................... 260/523 R
3,255,243   6/1966   Saur et al....................... 260/524 R FOREIGN PATENTS OR APPLICATIONS
2,144,920   4/1972   Germany ........................... 260/475

Primary Examiner—Lorraine A. Weinberger
Assistant Examiner—Richard D. Kelly
Attorney, Agent, or Firm—Sherman & Shalloway

[57] ABSTRACT

A process for preparing benzoic acid by oxidizing toluene with a molecular oxygen containing gas in the liquid phase, which is characterized in that the oxidation is performed in the substantial absence of lower fatty acids and/or halogen compounds, and in the presence of a catalyst composed of component A which is a nickel compound, and component B which is a manganese compound, the total amount of nickel metal and manganese metal ranging from 0.003 to 0.5% by weight based on the total oxidation reaction mixture, and the weight ratio of the nickel metal to the manganese metal being from 99.8/0.2 to 60/40, when the oxidation is performed at a temperature between 135°C. and 185°C., and from 99.8/0.2 to 5/95 when the oxidation is performed at a temperature between 185° and 235°C.

6 Claims, No Drawings

PROCESS FOR PREPARATION OF BENZOIC ACID

This invention relates to a process for preparing benzoic acid by oxidizing toluene with molecular oxygen in the liquid phase. More particularly, the invention is characterized in that the oxidation is performed in the substantial absence of lower fatty acids and halogen compounds, and in the presence of a catalyst composed of:

A. component A which is a nickel compound, and
B. component B which is a manganese compound.

Benzoic acid is a compound useful as an intermediate of ε-caprolactam, phenol, terephthalic acid and dyestuffs, and also by itself as an additive to food. It has been industrially produced in large quantities.

Many preparations have already been proposed for preparing benzoic acid, but they are invariably subject to serious industrial defects.

For instance, when toluene is oxidized with molecular oxygen in a lower fatty acid solvent such as acetic acid in the presence of a heavy metallic compound catalyst to make benzoic acid, the equipment is corroded by the lower fatty acid, and its efficiency is reduced by the use of the solvent. Furthermore, the lower fatty acid enters into the oxidation product, making the recovery and refining of the benzoic acid complex, and additional apparatus is necessary specifically for recovery and refining of the lower fatty acid.

With the preparation of benzoic acid by oxidizing toluene with molecular oxygen in the presence of a heavy metallic compound catalyst and a halogen compound promoter, again the corrosion of equipment by the halogen compound is conspicuous, and the impurities originating from the halogen compound are apt to mix with the benzoic acid. The heavy metallic compound catalysts employed in the above-described processes include organic or inorganic acid salts of heavy metals such as cobalt, manganese, and chromium. As the halogen compound, sodium bromide, ammonium bromide, and hydrogen bromide, have been proposed. The use of bromides of heavy metals such as cobalt and manganese has also been proposed, in a combined form with the foregoing heavy metal component in the catalyst.

Accordingly, the most widely practiced method for the industrial scale production of benzoic acid in large quantities is the oxidation of toluene with molecular oxygen in the liquid phase, using a cobalt compound alone as the catalyst, in the absence of lower fatty acid solvents and halogen compound promoter (see *Hydrocarbon Processing*, Vol. 43, No. 11, p. 174 and *Hydrocarbon Processing*, Nov. 1970, pp. 141 – 142).

This method hardly causes corrosion of the equipment, and allows relatively easy separation and refining of the produced benzoic acid. Thus the method is much more advantageous than the above-described two processes, but it still has a defect in that the selectivity for benzoic acid from toluene is insufficient. This is because in the oxidation many by-products such as carbon monoxide, carbon dioxide, formic acid, acetic acid, biphenyl, monomethyl biphenyls, biphenyl monocarboxylic acids, phenol, and high-boiling tar-like materials of unknown composition are formed. Of these by-products, formic acid and acetic acid leave the oxidation reactor with the waste gas, and cool and condense with the water formed during the oxidation. The diluted aqueous solution of formic acid and acetic acid causes environmental pollution if discharged as it is, and therefore must go through difficult processing to be rendered harmless.

Furthermore, the conventional method achieves only an insufficient rate of oxidation reaction, and when the oxidation temperature is raised to increase the rate of reaction, formation of the by-products increases, thus reducing the selectivity for the benzoic acid.

Accordingly, an object of the present invention is to provide a process for the preparation of benzoic acid with high selectivity and at a high rate of reaction, by oxidizing toluene with molecular oxygen in the presence of a heavy metallic component catalyst, without using the lower fatty acid solvents or halogen compound promotors.

Still other objects and advantages of the invention will become apparent from the following description.

The foregoing objects and advantages are accomplished according to the present invention, by a process for preparing benzoic acid through the oxidation of toluene in the liquid phase with a molecular oxygen-containing gas, which is characterized in that 1. there is the substantial absence of a lower fatty acid or a halogen compound,
2. a catalyst is allowed to be present in the reaction system, said catalyst comprising
   A. component A which is a cobalt or nickel compound, and
   B. component B which is a manganese compound,
3. the concentration of the catalyst being such that when said components A and B are calculated as the respective metals,
   i. the total amount of nickel metal and manganese metal is 0.003 – 0.5% by weight based on the total oxidation reaction mixture,
   ii. when the oxidation is performed at a temperature not lower than 135°C. but lower than 185°C., the weight ratio of the nickel metal to the manganese metal is 99.8/0.2 to 60/40, and
   iii. when the oxidation is performed at a temperature between 185° – 235°C., the weight ratio of the nickel metal to the manganese metal is 99.8/0.2 to 5/95.

It is known that in the preparation of benzoic acid by oxidizing toluene with molecular oxygen in the liquid phase without using a lower fatty acid solvent or halogen compound promotor, numbers of heavy metallic compounds generally exhibit catalytic action. Because no catalyst better than the cobalt compound has been found in the past, however, the cobalt compound alone has been used industrially almost exclusively.

However, according to the present invention, it has been discovered that the combined use of a manganese compound, (which by itself is a catalyst inferior to the cobalt compound), combined with a nickel compound, and at specific ratios, achieves conspicuously synergistic effect, and that excellent reaction results that would be unexpected from use of the cobalt compound along, or the nickel or manganese compound alone, alone, be obtained.

This synergistic effect is especially unexpected, in view of the known fact that the concurrent presence of a minor amount of a manganese compound with a cobalt compound in a similar oxidation system but using an acetic acid solvent causes a drastic reduction in the yield of benzoic acid (see Japanese Pat. application No. 11650/69).

When a manganese compound (component B) is used in combination with a nickel compound (component A) at the specified ratios of the catalyst in accordance with this invention, the formation rate of by-products such as carbon monoxide, carbon dioxide, formic acid, and acetic acid, decreases, and the selectivity of benzoic acid production from toluene improves. The increase in the selectivity demonstrated in the Examples, infra, may not appear very great numerically, but it must be borne in mind that in the large scale industrial production of benzoic acid, the economic advantages derived therefrom are very substantial. For example, in a factory producing benzoic acid at a capacity of 50,000 tons per year, improvement in the selectivity from 82.0% (Run No. 1-a) to 93.4% (Run No. 1-c) means the saving of approximately 5,600 tons of toluene per year. Also, since the formation rate of formic acid and acetic acid is notably decreased by using this invention, the labor and expense of making the waste water harmless can be markedly decreased.

Furthermore, the conventional oxidation system utilizing the cobalt compound alone as the catalyst is subject to the annoying problem that if the reaction temperature is raised to increase the rate the of oxidation reaction, a decrease in the selectivity for benzoic acid results. By contrast, substantially no decrease in the selectivity is observed at such high temperatures as, for example, 170° to 200°C., according to the subject process, and in certain cases even an improved selectivity can be obtained. Thus, when the process of this invention is practised at such high temperatures, the reaction can be performed with high selectivity and at far greater rates than those achievable at the temperature range of 130° to 170°C., which is that employed in conventional industrial processes. The industrial advantages of the process are therefore indeed great.

As already mentioned, the nickel compounds or manganese compounds by themselves exhibit inferior catalytic properties to that of the cobalt compound, and the independent use of such compounds as the catalyst has been rejected as entirely unpractical. Nevertheless, when a manganese compound (component B) is combined with a nickel compound (component A) at the specific ratios according to the invention, a far higher catalytic activity compared with using each of the compounds alone (particularly the nickel compound or manganese compound alone), can be achieved. Furthermore, the undesirable side-reactions are inhibited, consequently producing benzoic acid with high selectivity and at a high rate of reaction.

As is demonstrated in Table 3, infra, the rate of the oxidation reaction drops remarkably at reaction temperatures lower than 135°C. Therefore, such low temperatures are unpractical. Temperatures not lower than 150°C. are preferred from the standpoint of the rate of reaction. At temperatures not lower than 135°C. but lower than 185°C., the synergistic effect of components A and B can be satisfactorily achieved only when component A is predominantly present in the catalyst, probably due to the weak catalytic activity of the manganese compound (component B). Thus, when the weight ratio of the nickel metal to manganese metal in the catalyst is outside the range of 99.8/0.2 to 60/40, (the compounds constituting the catalyst being calculated as their respective metallic components), the improvement in the benzoic acid selectivity compared with the conventional practice using a cobalt compound alone is insufficient.

When the reaction temperature is raised to between 185°C. and 235°C., the range of the weight ratio at which the synergistic effect is sufficiently exhibited is broadened, probably due to the increased catalytic activity of the manganese compound. Thus, in the wide range of the weight ratio of the nickel metal to the manganese metal of 99.8/0.2 to 5/95, the combined catalyst gives better selectivity than that of the cobalt compound alone, not to mention the nickel compound alone.

Throughout both of the above temperature ranges, the preferred weight ratio of the nickel metal to the manganese metal is 99.5/0.5 to 60/40, particularly 99/1 to 75/25.

When the reaction temperature is raised above 235°C., the selectivity markedly drops, and the reaction product is heavily colored, becoming unsuitable for any practical use. From the standpoint of selectivity, temperatures not higher than 220°C. are preferred.

Furthermore, according to the invention the catalyst is used at such a quantity that the sum of
A. the nickel compound, and
B. manganese compound to be contained in the total liquid oxidation reaction mixture should be, when calculated as nickel metal and manganese metal, 0.003 – 0.5% by weight, and preferably 0.005 – 0.1% by weight. When it is less than 0.003% by weight, the selectivity and rate of reaction become low, and the reaction product is heavily colored. On the other hand, when it is more than 0.5% by weight, both the selectivity and rate of reaction also are low, and the use of such large amounts of the catalyst is economically disadvantageous.

As the nickel compound (component A) and manganese compound (component B) useful for the invention, those which are soluble in the reaction mixture are preferred, but difficulty soluble or insoluble compounds which are convertible to soluble form in the reaction mixture may also be used. Particularly when the oxidation reaction is performed continuously in a single reactor under thorough mixing, the benzoic acid concentration in the oxidation reaction mixture is high, and even the insoluble catalytic components can be quickly converted to soluble form, and therefore can be used with relative ease.

When the oxidation reaction is performed in batches, a minor amount of benzoic acid may be added to the starting toluene, which results in a shorter induction period, probably because such an addition increases the solubility of nickel compound and manganese compound, and accelerates the conversion of such compounds to soluble form.

Examples of the nickel compounds and manganese compounds useful for the present invention include the following:

1. nickel, and manganese salts of aliphatic carboxylic acids such as formic acid, acetic acid, propionic acid, butyric acid, stearic acid, palmitic acid, oleic acid, and linoleic acid;
2. nickel, and manganese salts of aromatic carboxylic acids such as benzoic acid and toluic acid;
3. nickel, and manganese salts of alicyclic carboxylic acids such as naphthenic acid;
4. complex salts of nickel and manganese, such as acetylacetonate, methylacetoacetate, and ethylacetoacetate; and
5. metals and inorganic compounds such as nickel metal and manganese metal; and carbonates, oxides, and hydroxides of nickel and manganese.

Of the foregoing compounds, particularly the organic carboxylates of nickel and manganese, such as acetate, benzoate, toluate, and naphthenate, are preferred. They are invariably easily available, and exhibit good solubility in the reaction mixture.

The oxidation reaction of the present invention is preferably performed in the absence of a solvent, but if desired, a diluent which is stable under the oxidation conditions, such as benzene, biphenyl, or methyl benzoate, may be employed.

In the oxidation, lower fatty acids such as acetic acid, acetic anhydride, propionic acid, and monochloroacetic acid, which are the known solvents useful in the conventional oxidation of alkyl-substituted aromatic compounds; or halogen or halogen compound promotors such as bromine or bromine compounds; are not used and unnecessary.

Such lower fatty acid solvents cause corrosion of the equipment at the reaction temperatures at which the subject process is practiced, and also decompose during the oxidation reaction, causing a heavy economic loss. Furthermore, they render the separation of benzoic acid from the oxidation product and purification thereof more complex.

The halogen or halogen compound also causes notable corrosion of the equipment. Again the impurities derived from the halogen compound increase the difficulties in the purification of benzoic acid.

Accordingly, the use of such lower fatty acid as the solvent or the halogen or halogen compounds as the promotor are not required in the subject process, and should positively be avoided.

The oxidation reaction according to this invention should be performed under a pressure sufficient to maintain the greatest part of the oxidation reaction mixture at the liquid phase. For this reason a pressure of $1 - 100$ Kg/cm$^2$G, particularly $2 - 30$ kg/cm$^2$G, is preferred. At lower pressures the rate of the oxidation reaction becomes low, and higher pressure increase the construction cost.

As the oxidation agent, gases containing molecular oxygen, such as pure oxygen, air of increased oxygen concentration, air, air diluted with waste gas of the oxidation, or gaseous mixtures of an inert gas such as carbon dioxide, nitrogen, or the like, with oxygen, may be used. Of the gases named, air is the most economical and the most preferred. The gases are contacted with the reaction mixture, by such means as blowing the gas into the reaction mixture in the liquid phase.

Because the waste gas contains, for example, toluene, water formed of the oxidation, and such by-products as formic acid and acetic acid, it is preferred to cool the waste gas to cause condensation of the toluene, water, formic acid and acetic acid. The condensation product is separable into two phases, toluene which can be returned to the oxidation step, and a diluted aqueous solution of formic acid and acetic acid which should be made non-toxic through such means as an activated sludge process, and discharged.

The oxidation reaction according to the subject process can be practiced either continuously or in batches.

According to the invention, oxidation reaction is preferably allowed to progress until the benzoic acid content of the reaction product reaches $10 - 65\%$ by weight, particularly $20 - 55\%$ by weight. When the benzoic acid content is below 20 wt.%, particularly below 10 wt.%, the benzoic acid yield per run is low and uneconomical. If the benzoic acid content exceeds 55 wt.%, particularly 65 wt.%, the rate of reaction is objectionably reduced.

The oxidation reaction product obtained in accordance with the subject process contains, besides benzoic acid which is the object unreacted toluene, intermediate products such as benzyl alcohol, benzaldehyde, benzylbenzoate, etc., and by-products such as biphenylmonocarboxylic acids. The reaction product, therefore, should preferably be treated by such known means as distillation, so that the unreacted toluene and intermediate products may be separated and returned to the oxidation system. All of the foregoing intermediate products, i.e., benzyl alcohol, benzaldehyde, and benzylbenzoate, are ultimately convertible to benzoic acid through further oxidation. By recycling them to the oxidation system, therefore, the loss of toluene in the form of the intermediate products can be avoided. The recycling of benzaldehyde has also another advantage in the batch preparation of the oxidation reaction, in that the presence of a minor amount of benzaldehyde together with the starting toluene contributes to shorten the induction period.

The benzoic acid separated from the oxidation product can be further purified if the occasion demands, by such means as recrystallization or distillation.

The invention will be more specifically illustrated by the following Examples.

EXAMPLE 1

A 500-cc titanium autoclave equipped with a reflux condenser, a stirrer, and a gas inlet was charged with 200 g of toluene, 5 g of benzoic acid, 1 g of benzaldehyde, and cobalt acetate and manganese acetate containing metallic cobalt (Co) and manganese (Mn) in the amounts indicated in Table 1, respectively. Air was blown into the autoclave under high speed agitation, under a pressure of 10 kg/cm$^2$ gauge and at a temperature of 190°C., while adjusting the flow rate at the gas outlet to 1,500 cc/min. After the absorption of oxygen started, the reaction was conducted for 3 hours. After completion of the reaction, the reaction product was cooled and recovered. The content of each component, i.e., benzoic acid, benzyl alcohol, benzaldehyde, and in the reaction product was determined by chemical analysis. Because benzyl alcohol, benzaldehyde, and benzylbenzoate are intermediates to benzoic acid, and their yields were very minor compared with that of benzoic acid, they were evaluated as effective products in the calculation of selectivity of the reaction according to the following equation.

$$\text{Selectivity}(\%) = \frac{\text{formed}\left(\begin{array}{l}\text{benzoic acid} + \text{benzyl alcohol} + \\ \text{benzaldehyde} + \text{benzylbenzoate} \times 2\end{array}\right)(\text{mmol})}{\text{Consumed toluene (mmol)}} \times 100$$

The amounts of formic acid and acetic acid were also analyzed, and their yield was calculated according to the following equation.

$$\text{Yield of formic acid and acetic acid } (\%) = \frac{\text{formed} \left( \begin{array}{c} \text{formic acid} \times 1/7 + \\ \text{acetic acid} \times 2/7 \end{array} \right) (\text{mmol})}{\text{consumed toluene (mmol)}} \times 100$$

Further, in order to compare the rate of reaction, the formation rate of benzoic acid was calculated by the equation below:

$$\text{Formation rate of benzoic acid (g/hr.)} = \frac{\text{formed benzoic acid (g)}}{\text{reaction time (hr.)}}$$

The results were as given in Table 1 below.

Table 1

| Run No. | Amount of Catalyst Co (mg) | Mn (mg) | Selectivity (%) | Yield of Formic Acid and Acetic Acid (%) | Formation Rate of Benzoic Acid (g/hr.) | Remarks |
|---|---|---|---|---|---|---|
| 1-a | 60.0 | 0 | 82.0 | 1.4 | 35.8 | Control |
| 1-b | 59.88 | 0.12 | 88.5 | 1.1 | 37.5 | Example |
| 1-c | 59.7 | 0.3 | 91.8 | 1.0 | 39.8 | " |
| 1-d | 59.4 | 0.6 | 93.2 | 0.9 | 41.3 | " |
| 1-e | 57.0 | 3.0 | 93.4 | 0.8 | 40.8 | " |
| 1-f | 45.0 | 15.0 | 93.0 | 0.8 | 40.6 | " |
| 1-g | 36.0 | 24.0 | 92.0 | 0.8 | 40.0 | " |
| 1-h | 12.0 | 48.0 | 89.8 | 1.0 | 36.7 | " |
| 1-i | 3.0 | 57.0 | 87.2 | 1.1 | 29.1 | " |
| 1-j | 0 | 60.0 | 82.9 | 1.3 | 24.6 | Control |

EXAMPLE 2

The same autoclave as used in Example 1 was charged with 200 g of toluene, 1 g of benzaldehyde, and cobalt naphthenate and manganese naphthenate containing metallic Co and Mn in the amounts indicated in Table 2. Air was blown into the autoclave under a pressure of 7 kg/cm² gauge and at a temperature of 160°C. under high speed agitation, while adjusting the flow rate at the gas outlet to 1,000 cc/min. After the absorption of oxygen started, the reaction was conducted for 4.5 hours. After completion of the reaction, the reaction product was recovered, and the selectivity of reaction and yield of formic acid and acetic acid were calculated similarly to Example 1. The results were as given in Table 2 below.

Table 2

| Run No. | Amount of Catalyst Co (mg) | Mn (mg) | Selectivity (%) | Yield of Formic Acid and Acetic Acid | Remarks |
|---|---|---|---|---|---|
| 2-a | 30.0 | 0 | 88.6 | 1.3 | Control |
| 2-b | 29.94 | 0.06 | 90.2 | 1.1 | Example |
| 2-c | 29.85 | 0.15 | 91.9 | 1.0 | " |
| 2-d | 29.7 | 0.3 | 93.0 | 0.9 | " |
| 2-e | 28.5 | 1.5 | 94.0 | 0.8 | " |

Table 2-continued

| Run No. | Amount of Catalyst Co (mg) | Mn (mg) | Selectivity (%) | Yield of Formic Acid and Acetic Acid | Remarks |
|---|---|---|---|---|---|
| 2-f | 22.5 | 7.5 | 93.2 | 0.8 | " |
| 2-g | 18.0 | 12.0 | 90.9 | 0.9 | " |
| 2-h | 0 | 30.0 | 82.3 | 1.4 | " |

EXAMPLE 3

The same autoclave as used in Example 1 was charged with 200 g of toluene, 5 g of benzoic acid, 1 g of benzaldehyde, cobalt benzoate containing 47.5 mg of Co and manganese acetylacetonate containing 2.5 mg of Mn. Air was blown into the autoclave under high speed agitation, under the pressure and at the temperature indicated in Table 3, while adjusting the flow rate at the gas outlet to 1,500 cc/min. After the absorption of oxygen started, the reaction was conducted for the time indicated in Table 3. After completion of the reaction, the selectivity of the reaction, yield of formic acid and acetic acid, and formation rate of benzoic acid were calculated similarly to Example 1. The results were as given in Table 3.

Table 3

| Run No. | Reaction Temp. (°C.) | Reaction Pressure (kg/cm G) | Reaction Time (hr.) | Selectivity (%) | Yield of Formic Acid and Acetic Acid (%) | Formation Rate of Benzoic Acid (g/hr.) | Remarks |
|---|---|---|---|---|---|---|---|
| 3-a | 125 | 10 | Absorption of oxygen did not begin even after 5 hours. | | | | Control |
| 3-b | 150 | 10 | 5 | 93.5 | 0.8 | 13.2 | Example |
| 3-c | 185 | 10 | 3 | 93.8 | 0.7 | 41.5 | " |
| 3-d | 220 | 15 | 2 | 85.4 | 1.2 | 57.2 | " |
| 3-e | 235 | 20 | 2 | 82.1 | 1.6 | 56.1 | " |
| 3-f | 250 | 25 | 2 | 73.0 | 2.9 | 46.5 | Control |

EXAMPLE 4

A 500-cc stainless steel autoclave equipped with a reflux condenser, a stirrer, and a gas inlet was charged with 190 g of toluene, 5 g of benzoic acid, 5 g of benzaldehyde, and cobalt acetate tetrahydrate (Co content: 23.6%) and manganese acetate tetrahydrate (Mn content: 22.4%) of the amounts indicated in Table 4 respectively. Air was blown into the autoclave under a pressure of 10 kg/cm² gauge and at a temperature of 180°C. under high speed agitation, while adjusting the flow rate at the gas outlet to 1,500 cc/min. After the absorption of oxygen started, the reaction was conducted for 3 hours. The condition of the feed was such that the total sum of Co and Mn was varied for each run, while maintaining the ratio of Co to Mn both as metals at approximately 95:5.

After completion of the reaction, the selectivity, yield of formic acid and acetic acid, and the formation rate of benzoic acid were calculated similarly to Example 1. The results were as given in Table 4.

Table 4

| Run No. | Amount of Catalyst Cobalt Acetate (g) | Manganese Acetate (g) | Metal Concentration in Starting Feed Co (wt%) | Mn (wt%) | Selectivity (%) | Yield of Formic Acid and Acetic Acid (%) | Formation Rate of Benzoic Acid (g/hr.) | Remarks |
|---|---|---|---|---|---|---|---|---|
| 4-a | 0.012 | 0.00067 | 0.0014 | 0.000075 | 65.4 | 3.3 | 5.8 | Control |
| 4-b | 0.025 | 0.0013 | 0.0030 | 0.00015 | 88.8 | 1.2 | 28.5 | Example |
| 4-c | 0.040 | 0.0022 | 0.0047 | 0.00025 | 90.0 | 1.0 | 36.1 | " |
| 4-d | 0.081 | 0.0045 | 0.0096 | 0.00050 | 93.9 | 0.6 | 37.5 | " |
| 4-e | 0.24 | 0.013 | 0.028 | 0.0015 | 92.6 | 0.8 | 36.5 | " |
| 4-f | 0.40 | 0.022 | 0.047 | 0.0025 | 91.3 | 1.0 | 33.5 | " |
| 4-g | 0.81 | 0.045 | 0.095 | 0.0050 | 90.3 | 0.9 | 31.0 | " |
| 4-h | 1.6 | 0.089 | 0.19 | 0.0099 | 89.0 | 1.3 | 25.8 | " |
| 4-i | 4.8 | 0.27 | 0.55 | 0.029 | 68.2 | 3.6 | 6.9 | Control |

EXAMPLE 5

The same autoclave as used in Example 4 was charged with 200 g of toluene, 5 g of benzoic acid, and the various cobalt compounds and manganese compounds specified in Table 5. Air was blown into the autoclave under high speed agitation and a pressure of 10 kg/cm² gauge and at a temperature of 170°C., while adjusting the flow rate at the gas outlet to 1,500 cc/min. After the absorption of oxygen started, the reaction was conducted for 3 hours. The types of the compounds serving as the catalytic components were varied, but the amounts of feed were kept constant, which were 29 mg as cobalt metal, and 1 mg as manganese metal.

After completion of the reaction, the selectivity, yield of formic acid and acetic acid, and the formation rate of benzoic acid were calculated similarly to Example 1. The results were as given in Table 5.

Table 5

| Run No. | Catalyst Cobalt Compound | Manganese Compound | Selectivity (%) | Yield of Formic Acid and Acetic Acid (%) | Formation Rate of Benzoic Acid (g/hr.) |
|---|---|---|---|---|---|
| 5-a | cobalt toluate | finely divided manganese metal | 93.5 | 0.8 | 31.5 |
| 5-b | cobalt acetylacetate | manganese carbonate | 92.4 | 0.9 | 32.1 |
| 5-c | cobalt oleate | manganese butyrate | 92.0 | 0.9 | 30.6 |
| 5-d | finely divided cobalt metal | manganese benzoate | 93.2 | 0.8 | 29.8 |

EXAMPLE 6

A 500-cc stainless steel autoclave equipped with a reflux condenser, a stirrer, and a gas inlet was charged with 200 g. of toluene, 5 g of benzoic acid, 5 g of benzaldehyde, and nickel acetate, manganese acetate, or cobalt acetate containing various quantities of Ni, Mn, or Co, respectively, as indicated in Table 6. Air was blown into the autoclave under the pressures and at the temperatures varied for each run as indicated in Table 6, under high speed agitation, while adjusting the flow rate at the gas outlet to the level again indicated in Table 6. After the absorption of oxygen started, the reaction of each run was conducted for the time indicated in Table 6. After completion of the reaction, the selectivity, yield of formic acid and acetic acid, and the formation rate of benzoic acid were calculated similarly to Example 1.

Table 6

| Run No. | Amount of Catalyst Ni (mg) | Mn (mg) | Co (mg) | Reaction Temp. (°C.) | Reaction Pressure (kg/cm²G) | Flow Rate of Air (cc/min.) | Reaction Time (hr.) | Selectivity (%) | Yield of Formic Acid and Acetic Acid (%) | Formation Rate of Benzoic Acid | Remarks |
|---|---|---|---|---|---|---|---|---|---|---|---|
| 6-a | 60.0 | 0.0 | 0.0 | 220 | 15 | 2,000 | 2.0 | 74.3 | 2.0 | 15.1 | Control |
| 6-b | 38.0 | 22.0 | 0.0 | 220 | 15 | 2,000 | 2.0 | 88.1 | 1.1 | 57.8 | Example |
| 6-c | 0.0 | 60.0 | 0.0 | 220 | 15 | 2,000 | 2.0 | 79.6 | 1.7 | 44.1 | Control |
| 6-d | 0.0 | 0.0 | 60.0 | 220 | 15 | 2,000 | 2.0 | 74.4 | 2.5 | 36.9 | " |
| 6-e | 60.0 | 0.0 | 0.0 | 200 | 15 | 1,700 | 2.5 | 69.8 | 2.3 | 10.2 | Control |
| 6-f | 38.0 | 22.0 | 0.0 | 200 | 15 | 1,700 | 2.5 | 90.0 | 0.9 | 41.9 | Example |
| 6-g | 0.0 | 60.0 | 0.0 | 200 | 15 | 1,700 | 2.5 | 82.2 | 1.5 | 32.8 | Control |
| 6-h | 0.0 | 0.0 | 60.0 | 200 | 15 | 1,700 | 2.5 | 79.5 | 2.0 | 38.1 | " |
| 6-i | 38.0 | 22.0 | 0.0 | 180 | 15 | 1,500 | 3.0 | 89.2 | 1.0 | 30.1 | Example |

Table 6-continued

| Run No. | Amount of Catalyst | | | Reaction Temp. (°C.) | Reaction Pressure (kg/cm²G) | Flow Rate of Air (cc/min.) | Reaction Time (hr.) | Selectivity (%) | Yield of Formic Acid and Acetic (%) | Formation Rate of Benzoic Acid | Remarks |
|---|---|---|---|---|---|---|---|---|---|---|---|
| | Ni (mg) | Mn (mg) | Co (mg) | | | | | | | | |
| 6-j | 38.0 | 22.0 | 0.0 | 235 | 20 | 2,000 | 2.0 | 86.9 | 1.2 | 58.6 | ″ |

We claim:

1. A process for preparing benzoic acid by oxidizing toluene with molecular oxygen containing gas in the liquid phase, which is characterized in that the oxidation is performed
   1. in the substantial absence of lower fatty acids and/or halogen compounds, and
   2. in the presence of a catalyst composed of
      A. component A which is a nickel compound, and
      B. component B which is a manganese compound,
   3. the concentration of the catalyst being such that, when said components A and B are calculated as the respective metals,
      i. the total amount of nickel metal and manganese metal ranges from 0.003 to 0.5% by weight based on the total oxidation reaction mixture,
      ii. when the oxidation is performed at a temperature not lower than 135°C. but lower than 185°C., the weight ratio of the nickel metal to the manganese metal being 99.8/0.2 to 60/40, and
      iii. when the oxidation is performed at a temperature between 185° – 235°C., the weight ratio of the nickel metal to the manganese metal being 99.8/0.2 to 5/95.

2. A process for preparing benzoic acid in accordance with claim 1, in which the oxidation is performed at a temperature between 135° and 235°C., the weight ratio of the nickel metal to the manganese metal in the catalyst being within the range of 99.5/0.5 to 60/40.

3. A process for preparing benzoic acid in accordance with claim 1, in which the oxidation is performed at a temperature between 150° – 220°C.

4. A process for preparing benzoic acid in accordance with claim 1, in which the oxidation is performed at a temperature between 150° – 220°C. and the weight ratio of the nickel metal to the manganese metal in the catalyst is within the range of 99/1 to 75/25.

5. A process for preparing benzoic acid in accordance with claim 1, in which the sum of the nickel metal and manganese metal is within the range of 0.005 – 0.1% by weight based on the total oxidation reaction mixture.

6. A process for preparing benzoic acid in accordance with claim 1, in which both catalyst components are at least partially soluble in the oxidation reaction mixture.

* * * * *